(12) United States Patent
Vissiere et al.

(10) Patent No.: US 11,988,512 B2
(45) Date of Patent: *May 21, 2024

(54) METHOD FOR ESTIMATING THE MOVEMENT OF AN OBJECT MOVING IN A MAGNETIC FIELD

(71) Applicant: SYSNAV, Vernon (FR)

(72) Inventors: David Vissiere, Paris (FR); Mathieu Hillion, Vernon (FR)

(73) Assignee: SYSNAV, Vernon (FR)

( * ) Notice: Subject to any disclaimer, the term of this patent is extended or adjusted under 35 U.S.C. 154(b) by 184 days.

This patent is subject to a terminal disclaimer.

(21) Appl. No.: 16/630,157

(22) PCT Filed: Jul. 13, 2018

(86) PCT No.: PCT/FR2018/051783
§ 371 (c)(1),
(2) Date: Jan. 10, 2020

(87) PCT Pub. No.: WO2019/012239
PCT Pub. Date: Jan. 17, 2019

(65) Prior Publication Data
US 2020/0132464 A1 Apr. 30, 2020

(30) Foreign Application Priority Data

Jul. 13, 2017 (FR) .................................. 1756675

(51) Int. Cl.
*G01C 21/16* (2006.01)
*G01C 21/08* (2006.01)

(52) U.S. Cl.
CPC ......... *G01C 21/1654* (2020.08); *G01C 21/08* (2013.01)

(58) Field of Classification Search
CPC ... G01C 21/08; G01C 21/165; G01C 21/1654
See application file for complete search history.

(56) References Cited

U.S. PATENT DOCUMENTS

| 2003/0158699 | A1* | 8/2003 | Townsend | G01C 17/30 702/38 |
| 2014/0320121 | A1* | 10/2014 | Perttunen | G06Q 20/102 324/244 |
| 2017/0074660 | A1 | 3/2017 | Gann et al. | |

FOREIGN PATENT DOCUMENTS

| EP | 2541199 A1 * | 1/2013 | ............. B64G 1/288 |
| EP | 2541199 A1 | 1/2013 | |

(Continued)

OTHER PUBLICATIONS

International Preliminary Report on Patentability received for PCT Patent Application No. PCT/FR2018/051783, dated Jan. 23, 2020, 19 pages (10 pages of English Translation and 9 pages of Original Document).

(Continued)

*Primary Examiner* — Aaron L Troost
(74) *Attorney, Agent, or Firm* — WOMBLE BOND DICKINSON (US) LLP (57) ABSTRACT

A method for estimating the movement of an object moving in an ambient magnetic field. The method includes acquiring by a magnetic measuring device integral with the object at least one component of the magnetic field and/or at least one i-th derivative of the magnetic field, with $n+1 \geq i \geq 1$, $n \geq 1$, at the level of the magnetic measuring device. The method then estimates at least one component of the movement of the object using at least one component of the equation $\nabla_n B = f_n(\Omega) \cdot \nabla_n B + g_n(\nabla_{n+1} B) \cdot V$, where $\nabla_n B$ is an n-th derivative of the magnetic field, $\Omega$ is the instantaneous angular velocity, $V$ is the instantaneous linear velocity, and $f_n$ and $g_n$ are predetermined functions.

20 Claims, 2 Drawing Sheets

(56) References Cited

FOREIGN PATENT DOCUMENTS

| | | |
|---|---|---|
| FR | 2914739 A1 | 10/2008 |
| FR | 3050524 A1 | 10/2017 |
| FR | 3071941 A1 | 4/2019 |

OTHER PUBLICATIONS

International Search Report and Written Opinion received for PCT Patent Application No. PCT/FR2018/051783, dated Oct. 31, 2018, 21 pages (10 pages of English Translation and 11 pages of Original Document).

* cited by examiner

METHOD FOR ESTIMATING THE MOVEMENT OF AN OBJECT MOVING IN A MAGNETIC FIELD

GENERAL TECHNICAL FIELD

The present invention relates to the field of navigation without GPS.

More precisely, it relates to a method for estimating the movement of an object by magneto-inertial techniques.

PRIOR ART

So-called magneto-inertial navigation techniques make it possible to estimate precisely the velocity (and therefrom, by integration, the position) of a solid in a place where the magnetic field is disturbed.

Precisely, it has been proposed in the patent FR2914739 to use, as a complement to the equations already used in conventional magneto-inertial techniques, the equation $\dot{B}=-\Omega\Lambda B+\nabla\cdot V$ to estimate the (linear) velocity vector V, from the angular velocity vector $\Omega$ (generally measured by gyrometers of the inertial unit), measurements of the magnetic field B and its derivatives with respect to time $\dot{B}$ and its spatial derivatives $\nabla B$ (gradient), measured or estimated.

Thanks to this information on the velocity of the solid, the error on the estimation of position will be in the worst of cases proportional to time, unlike conventional inertial techniques where it is quadratic in time.

These magneto-inertial techniques thereby provide entire satisfaction, and require inertial sensors of lower performance than conventional inertial methods (based on integration through a Kalman filter or another observer of information coming from gyrometers and accelerometers embedded on the solid of which it is wished to estimate the position and the velocity: typically, the gyrometers "maintain" a point of reference, in which a double temporal integration of the measurements of the accelerometers makes it possible to estimate the movement) and are thus less bulky.

Thus, at least one inertial unit is coupled to one or more magnetometers distributed spatially (typically magnetometers arranged on the summits of a right-handed trihedron) and integral with the inertial unit (typically placed at the origin of the trihedron). The data coming from these sensors are transmitted to an electronic acquisition and calculation card which delivers position and velocity information to the user by resolution of the aforesaid equation. The use of several magnetometers makes it possible to measure directly the magnetic field gradients for example by finite difference (Taylor development), instead of estimating them.

It is however observed that in the magneto-inertial navigation equation, information on the velocity is small in the directions (designated small) associated with small (or even zero) eigenvalues of the gradient.

In addition, this equation only has three components, which means that it brings only three constraints on the velocities (angular and linear V).

It would be desirable to have available a new magneto-inertial navigation method by measurement of the magnetic field gradient which offers greater precision in all directions, and which further improves performance.

DESCRIPTION OF THE INVENTION

The present invention thus relates, according to a first aspect, to a method for estimating the movement of an object moving in an ambient magnetic field, the method being characterised in that it comprises the steps of:

(a) Acquiring by magnetic measurement means integral with said object at least one component:
of the magnetic field and/or
of at least one i-th derivative of the magnetic field, with $n+1 \geq i \geq 1$, $n \geq 1$,
at the level of the magnetic measurement means;

(b) Estimating by the data processing means at least one component of the movement of said object using at least one component of the equation $\nabla_n B = f_n(\Omega) \cdot \nabla_n B + g_n(\nabla_{n+1} B) \cdot V$, where $\nabla_n B$ is an n-th derivative of the magnetic field, $\Omega$ the instantaneous angular velocity, V the instantaneous linear velocity, and $f_n$ and $g_n$ predetermined functions.

According to other advantageous and non-limiting characteristics:

the magnetic measurement means include at least one gradiometer, such that step (a) includes the acquisition by each gradiometer integral with said object of a component of at least one i-th derivative of the magnetic field at the level of the gradiometer;

the magnetic measurement means include at least one magnetometer, such that step (a) includes the acquisition by said magnetometer integral with said object of a component of the magnetic field at the level of the magnetometer;

the magnetic measurement means only include gradiometers or only magnetometers;

the magnetic measurement means are constituted of a plurality of gradiometers or magnetometers organised into triaxes, each triaxis being associated with a spatial position.

i=n, such that step (a) includes the acquisition by each gradiometer integral with said object of a component of the n-th derivative of the magnetic field at the level of the gradiometer;

at least $4n+8$ components of the n-th derivative of the magnetic field are acquired at step (a), and $3^{n+1}$ components of the equation $\nabla_n B = f_n(\Omega) \cdot \nabla_n B + g_n(\nabla_{n+1} B) \cdot V$ are used at step (b).

$n=1$;

also used at step (b) is at least one component of at least one supplementary equation $\nabla_k B = f_k(\Omega) \cdot \nabla_k B + g_k(\nabla_{k+1} B) \cdot V$, with $k \in [\![ 0; n-1 ]\!]$;

$k=0$, $f_0$=skew, $g_0$=id, such that the supplementary equation is $\dot{B} = -\Omega \times B + \nabla B \cdot V$;

step (a) further includes the acquisition by inertial measurement means integral with said object of at least one component of the angular velocity D.;

at least $(n+2)(n+4)$ components of the magnetic field and/or at least one i-th derivative of the magnetic field are acquired at step (a), and $3^{n+1}$ components of the equation $\nabla_n B = f_n(\Omega) \cdot \nabla_n B + g_n(\nabla_{n+1} B) \cdot V$ are used at step (b);

at least one relationship between the components of the equation $\nabla_n B = f_n(\Omega) \cdot \nabla_n B + g_n(\nabla_{n+1} B) \cdot V$ is determined at step (c) by application of the local version of at least one Maxwell equation to the components of the n-th derivative of the magnetic field $\nabla_n B$.

According to a second aspect, the invention relates to an equipment for estimating the movement of an object moving in an ambient magnetic field, characterised in that it includes data processing means configured to implement:

A module for receiving at least one component:
of the magnetic field and/or
of at least one i-th derivative of the magnetic field, with $n+1 \geq i \geq 1$, $n \geq 1$, acquired by magnetic measurement means integral with said object;

A module for estimating at least one component of the movement of said object using at least one component of the equation $\nabla_n B = f_n(\Omega) \cdot \nabla_n B + g_n(\nabla_{n+1} B) \cdot V$, where $\nabla_n B$ is an n-th derivative of the magnetic field, $\Omega$ the instantaneous angular velocity, V the instantaneous linear velocity, and $f_n$ and $g_n$ predetermined functions.

According to other advantageous and non-limiting characteristics:

The equipment is a case including the magnetic measurement means;

The equipment is a mobile terminal or a server, suited for communicating with a case including the magnetic measurement means.

According to a third aspect, the invention relates to a system including the equipment according to the second aspect of the invention and at least one connected case.

According to a fourth and a fifth aspect, the invention relates to a computer programme product including code instructions for the execution of a method for estimating the movement of an object moving in an ambient magnetic field according to the first aspect of the invention; and storage means readable by a computer equipment on which a computer programme product includes code instructions for the execution of a method for estimating the movement of an object moving in an ambient magnetic field according to the first aspect of the invention.

DESCRIPTION OF THE FIGURES

Other characteristics and advantages of the present invention will become clear on reading the description that follows of a preferential embodiment. This description will be given with reference to the appended drawings in which.

DETAILED DESCRIPTION

Principle

The present method proposes working not on the spatial and temporal variations in the magnetic field evaluated thanks to magnetometer measurements, but on the spatial and temporal variations in the magnetic gradients (i.e. spatial variations in the magnetic field) evaluated in particular thanks to gradiometer measurements.

In other words, a generalised equation is considered of the form $\nabla_n B = f_n(\Omega) \cdot \nabla_n B + g_n(\nabla_{n+1} B) \cdot V$, with $\nabla_n B$ the spatial gradient of order $n \geq 1$ written in the form of a vector (it will be understood that if n=0 then $\nabla_0 B = B$ and one returns to the known equation $\dot{B} = -\Omega \wedge B + \nabla B \cdot V$, and if n=1, $\nabla_1 B$ is the conventional gradient). $f_n$ and $g_n$ are then predetermined matrix functions which only depend on n and the hypotheses taken on the gradients (see hereafter).

It may be noted that $\nabla_n B$ and thus the generalised equation has $3^{n+1}$ components, and thereby brings a larger number of constraints on the velocities (angular $\Omega$ and linear V), in practice 2n+3 in light of the properties of the magnetic field (Maxwell equations), see hereafter.

In addition, these supplementary components make it possible to provide information in so-called small directions corresponding to small (or even zero) eigenvalues of the gradient.

Advantageously, at least one (and in a preferred manner each) other equation of the form $\nabla_k B = f_k(\Omega) \cdot \nabla_k B + g_k(\nabla_{k+1} B) \cdot V$ is also considered, with one or more values of $k \in [\![ 0; n-1 ]\!]$ (for example k may be equal to zero, which signifies that it is also possible to consider the original equation $\dot{B} = -\Omega \wedge B + \nabla B V$).

It may be noted that it is possible to work with a gradient represented in the terrestrial reference frame or in the reference frame linked to the object 1 of which the movement is estimated, and if needs be, the function g includes the products of $\nabla_{k+1} B$ by R and $R^T$ (i.e. $R(\nabla_{k+1} B) R^T$), where R is the matrix for passing from the terrestrial reference frame to the reference frame linked to the object 1.

Furthermore, in the remainder of the present description, the preferred example where n=1 will be detailed more precisely.

In an even more preferred manner, n=1 will be used and a single k=0, i.e. the system of two equations:

$$\begin{cases} \nabla B = f_1(\Omega) \cdot \nabla B + g_1(\nabla_2 B) \cdot V \\ \dot{B} = f_0(\Omega) \cdot B + g_0(\nabla B) \cdot V = -\Omega \wedge B + \nabla B \cdot V \end{cases}$$

The functions $f_n$ and $g_n$ may be calculated by those skilled in the art by iteratively derivating the equation $\dot{B} = -\Omega \wedge B + \nabla B \cdot V$. It may be seen that if n=0, one has $$f_0\left(\Omega = \begin{pmatrix} p \\ q \\ r \end{pmatrix}\right) = \text{skew}(\Omega) = \begin{bmatrix} 0 & -r & q \\ r & 0 & -p \\ -q & p & 0 \end{bmatrix} \text{ and}$$

$$g_0 = id = \begin{bmatrix} 1 & 0 & 0 \\ 0 & 1 & 0 \\ 0 & 0 & 1 \end{bmatrix}.$$

"skew" is the function that determines the antisymmetric matrix associated with the vector product by a vector. The functions $f_n$ and $g_n$ will be for example explained hereafter for n=1.

Architecture

Figure 1:
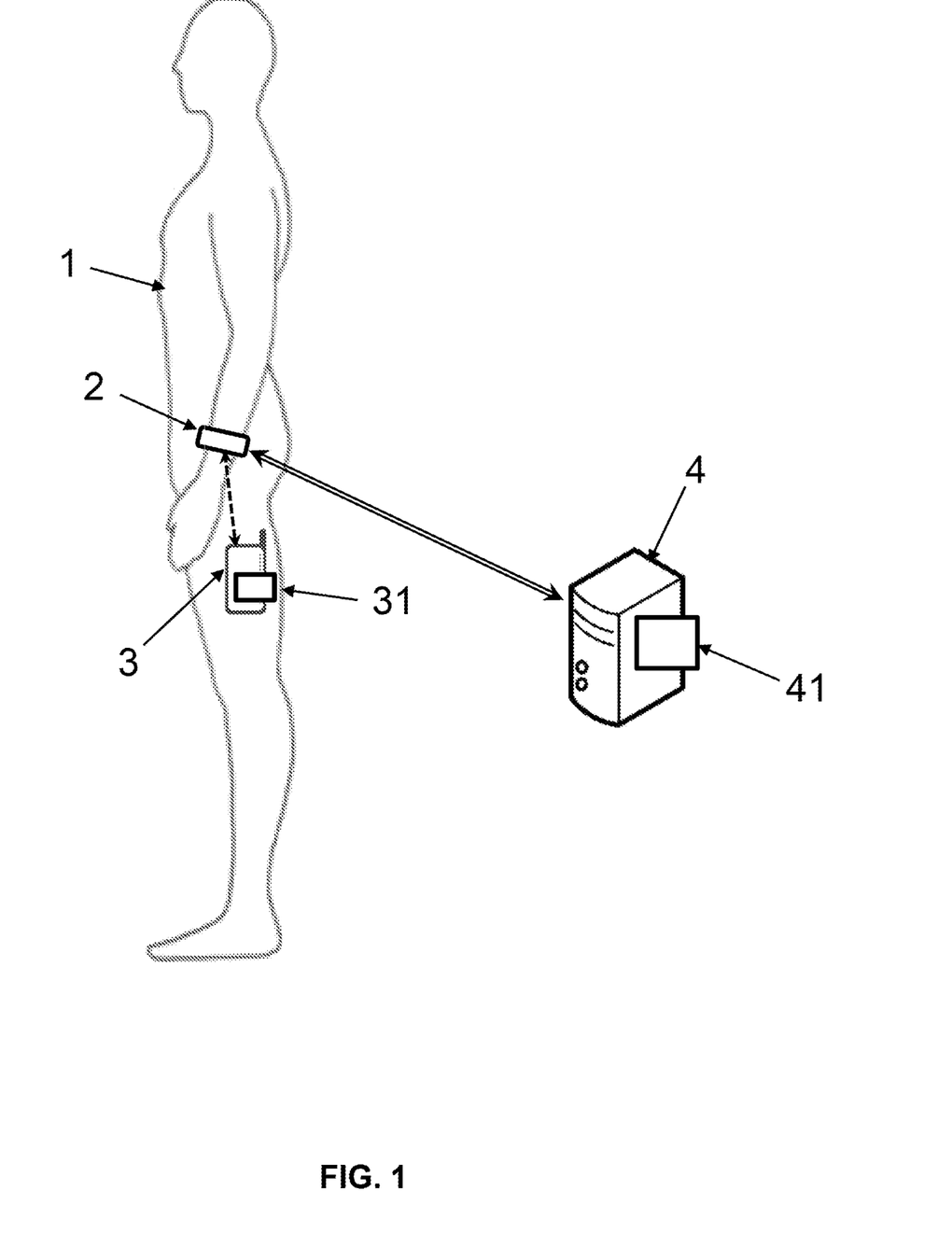
FIG. 1 is a diagram of equipment for the implementation of the method according to the invention.

With reference to FIG. 1, the present method enables the estimation of the movement of an object 1 moving in an ambient magnetic field (typically the Earth's magnetic field, which could be slightly altered by metal objects or nearby electric currents), noted $\vec{B}$. As already explained, the magnetic field is a vector field in three-dimensional space, that is to say associating a vector of three dimensions with each three-dimensional point in which the object is moveable.

This object 1 may be any moveable object of which knowledge of the position is desired, for example a wheeled vehicle, a drone, etc., but also a person or a part of the body of this person (his hands, his head, etc.).

The object 1 is equipped with magnetic measurement means 20, but preferentially the latter are not magnetometers but magnetic gradiometers as explained. More precisely, instead of measuring the value of the components of the magnetic field $\vec{B}$ the latter measure directly the value of the components of the magnetic field gradient $\vec{B}$, i.e. the value of the spatial derivatives. Such magnetic gradiometers 20 are known to those skilled in the art. According to certain embodiments of the invention, gradiometers could be used to measure directly the value of the second derivatives (second order gradient), and generally speaking i-th derivatives (i-th order gradient), $n+1 \geq i \geq 1$. Advantageously, $i=n$, that is to say that the spatial derivatives of all the terms of the equations used are directly measured, but it will be understood that the invention is not limited to this embodiment, in particular if several equations with k<n are considered. It should be noted that it is possible to have $i=n+1$, that is to say that the components of $\nabla_{n+1}B$ are measured directly. In the remainder of the present description, the example will be taken where $i \in \{n; n+1\}$, and thus gradiometers will be considered rather than magnetometers, but those skilled in the art will know how to transpose it.

It will be understood nevertheless that the present method can use any combination of magnetometers and/or gradiometers: either it only uses "simple" values of the magnetic field from which the values of derivatives are recalculated, which signifies that the magnetic measurement means are only magnetometers (i.e. virtually i=0); or it uses no "simple" value of the magnetic field (and uniquely derivatives to one or more given orders), which signifies that no standard magnetometer is required; or it also uses the values of the magnetic field (and no longer uniquely derivatives), and the system may include both standard gradiometers and magnetometers.

The gradiometers 20 are integral with the object 1, i.e. they have a movement substantially identical in the terrestrial reference frame. In a preferred manner, the reference frame of the object 1 is provided with an orthonormal cartesian point of reference in which the coordinates are noted $(x_1, x_2, x_3)$, the gradiometers 20 thus have a predetermined position in this point of reference.

Figure 2:
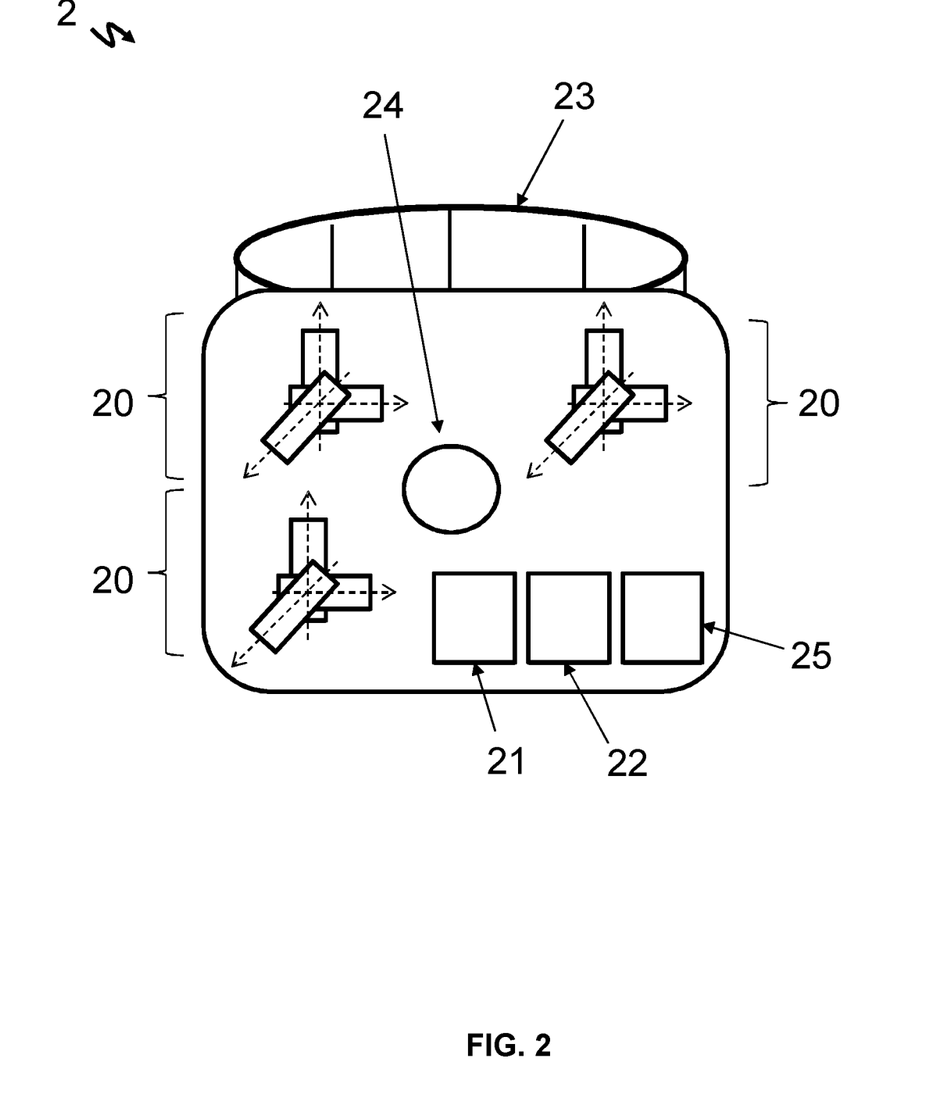
FIG. 2 represents in greater detail an example of a case for the implementation of the method according to the invention.

The gradiometers 20 are preferentially those of a case 2 such as represented in FIG. 2 having (for example if the object 1 is a person) means 23 for attachment to the object 1 (for example the wrist or the hand). These attachment means 23 consist for example of a bracelet, for example a self-gripping strap that grips the limb and enables an integral link. It will be understood that the invention is not limited to the estimation of the movement of a person, but it is particularly advantageous in such a use because it enables very reduced bulk, which is necessary for the case to be portable by a human in an ergonomic manner.

The gradiometer(s) 20 are "axial", that is to say capable of measuring a component of an i-th order spatial derivative of said magnetic field, i.e. the variation in a component of $\nabla_{i-1}B$ at the level of said gradiometers 20 along their axis (or in the case of magnetometers, i.e. i=0, a component of said magnetic field, i.e. the projection of said magnetic field vector $\vec{B}$ along their axis).

As explained before, $\nabla_i B$ has $3^{(i+1)}$ components, but it is not necessary to acquire all of these components and $2i+3$ suffice, as will be seen hereafter.

Advantageously the i-th order gradiometers 20 are thereby at least $3i+3$ in number, so as to be able to advantageously organise them in groups of three in "triaxes", i.e. a triplet of gradiometers 20 two by two orthogonal associated with the same spatial position and measuring the variation along the three axes of a same component of $\nabla_{i-1}B$, so as to be able to determine all the components of $\nabla_i B$.

The components of $\nabla_{i+1}B$ may next if necessary be determined by acquiring the components of $\nabla_i B$ in several spatial positions and by calculating the spatial variations, and so on. $2i+3+2(i+1)+3=4i+8$ i-th order gradiometers 20 suffice to calculate all the components of $\nabla_{i+1}B$, $6i+13$ i-th order gradiometers 20 suffice to calculate all the components of $\nabla_{i+2}B$, etc. (see hereafter).

In a preferred manner, the orthonormal point of reference associated with the object is chosen by convention (and by facility for the remainder of the present description) such that the triaxes are advantageously oriented in accordance with said orthonormal point of reference, so as to further facilitate the calculations.

But those skilled in the art will know in all cases how to transpose it to any spatial arrangement of gradiometers/magnetometers.

In the preferred case where n=1 and k=0, and the system of two equations is considered $$\begin{cases} \nabla B = f_1(\Omega) \cdot \nabla B + g_1(\nabla_2 B) \cdot V \\ \dot{B} = -\Omega \wedge B + \nabla B \cdot V \end{cases},$$

then one uses very advantageously a single triplet of magnetometers (i=0) and the remainder in gradiometers measuring the first or second order (i∈{1; 2})) spatial gradient, so as to be able to determine easily all the components of the two equations.

The case 2 may include processing means 21 (typically a processor) for implementing directly in real time the processing operations of the present method, or instead the measurements may be transmitted via communication means 25 to an external device such as a mobile terminal (smartphone) 3, or even a remote server 4, or instead the measurements may be recorded in local data storage memory means 22 (a flash type memory for example) for a posteriori processing for example on the server 4.

The communication means 25 may implement a short range wireless communication, for example Bluetooth or Wi-Fi (in particular in an embodiment with a mobile terminal 3) or even be means for connecting to a mobile network (typically UMTS/LTE) for a long distance communication. It should be noted that the communication means 25 may be for example a wired connection (typically USB) for transferring data from the local data storage means 22 to those of a mobile terminal 3 or a server 4.

If it is a mobile terminal 3 (respectively a server 4) that hosts the "intelligence", it includes processing means 31 (respectively 41) such as a processor for implementing the processing operations of the present method that are going to be described. When the processing means used are those 21 of the case 2, it may further include communication means 25 for transmitting the estimated position. For example, the position of the bearer may be sent to the mobile terminal 3 to display the position in a navigation software interface.

In the remainder of the present description, it will be seen that the data processing means 21, 31, 41 respectively of the case 2, a smartphone 3 and a remote server 4 may indifferently and according to the applications carry out all or part of the steps of the method.

Method

In a first step (a), the method includes the acquisition (in particular in a reference frame of the object 1) by the gradiometer(s)/magnetometer(s) 20 integral with said object 1, of at least one component:

of the magnetic field and/or of at least one i-th derivative of said magnetic field $\vec{B}$, with one or more values $i \in [\![1; n+1]\!]$.

As explained, various gradiometers/magnetometers may be used so as to measure various orders of derivatives or directly the values of the magnetic field.

Step (a) may also include the acquisition by the inertial measurement means 24 of at least one component of the angular velocity $\Omega$, or even by other means for measuring at least one component of the linear velocity V.

These quantities are advantageously measured with a dt sampling (i.e. every "dt" seconds) with dt very small compared to the characteristic time of the movements of the object 1, typically 40 ms.

As will be seen hereafter, the minimum number of components of the magnetic field and/or at least one i-th derivative of the magnetic field to acquire in order to guarantee an entirely determined system is 4n+8 (in this case 4n+8 components of the n-th derivative of the magnetic field, or alternatively 2n+3 components of the n-th derivative of the magnetic field and 2n+5 components of the n+1-th derivative of the magnetic field), corresponding to the number of independent components of $\nabla_n B$ (2n+3) and $\nabla_{n+1} B$ (2(n+1)+3).

Generally speaking, the minimum number of components of the i-th derivative (and/or of a higher order derivative) of the magnetic field to acquire in order to guarantee an entirely determined system is given by the formula $\Sigma_{p=i}^{n+1} 1(2p+3)$, that is to say (n−i+2)(n+i+4), because it is necessary to determine all the independent components of $\nabla_i B$ then $\nabla_{i+1} B, \ldots \nabla_{n+1} B$. In the extreme case i=0 (there are at least 3 magnetometers, or even uniquely magnetometers), this number is (n+2)(n+4). In other words, (n+2)(n+4) acquisitions of components of the magnetic field and/or at least one i-th derivative of the magnetic field (i.e. magnetic components of any order) guaranteed in an entirely determined system.

It may be noted that with this latter number (n+2)(n+4) of acquisitions of magnetic components, all the equations of the form $\nabla_k B = f_k(\Omega) \cdot \nabla_k B + g_k(\nabla_{k+1} B) \cdot V$, i.e. $\forall k \in [\![0; n-1]\!]$, including the original equation $\dot{B} = -\Omega \wedge B + \nabla B \cdot V$, may be entirely determined.

It will be noted that it is however entirely possible that fewer components, or even only one, are acquired, if sufficient velocity components are moreover acquired.

It is even possible that the system is under-determined if a single measurement is taken (i.e. an occurrence of step (a), corresponding to a single time step), while remaining determined if a set of measurements corresponding to a time interval is taken. The whole theory of dynamic observers is based on this principle, it is the notion of observability. There are even simple linear tools (Kalman criterion) which make it possible to know if a system is observable or not, i.e. if with a set Y of partial measurements of a state X (Y=CX), it is possible to work back to the state knowing that it verifies a differential equation of the type dX/dt=A·X.

In a step (b), the data processing means 21, 31, 41 estimate at least one component of the movement of the object 1, in particular all the components of the linear velocity V. One or more components of the angular velocity vector SI may also be estimated or at least verified (which is also possible for potential acquired components of the linear velocity V) if sufficient components of said equation $\nabla_n B = f_n(\Omega) \cdot \nabla_n B + g_n(\nabla_{n+1} B) \cdot V$ are available. To do so, one will use as explained, as a complement to the equations already used in conventional inertial techniques and optionally one or more components of the known equation $\dot{B} = -\Omega \times B + \nabla B \cdot V$, one or more components of the equation $\nabla_n B = f_n(\Omega) \cdot \nabla_n B + g_n(\nabla_{n+1} B) \cdot V$ to estimate the velocity vector V, from n-th order derivative values of the magnetic field $\nabla_n B$ (either directly measured, or calculated from measured values of derivatives of lower order i) and its derivatives with respect to time $\nabla_n B$ and its gradient $\nabla_{n+1} B$ (of which the components are either also directly measured (i=n+1), or calculated from measured values of derivatives of lower order i).

It may be noted that $\nabla_n B$ is obtained easily from the values of $\nabla_n B$ knowing the time step between two measurements. Alternatively, Kalman type filtering/estimation techniques or observers are used, which make it possible to do without this derivation.

Although $\nabla_n B$ has as explained $3^{n+1}$ components which are advantageously all used at step (b), in practice only 2n+3 components are independent.

The astute idea is to apply the local version of at least one Maxwell equation so as to determine at least one relationship between the components of the gradient of order n $\nabla_n B$, advantageously at least the local version of the Maxwell-Thomson equation and also advantageously the local version of the Maxwell-Ampère equation. The magnetic field is thereby zero rotational and/or zero divergence.

Those skilled in the art will be able to consult to this end the application FR1653493.

Example if n=1

If BY $$x = \frac{\partial By}{\partial x}$$

the derivative with respect to x of the component y of the magnetic field. All the other first derivatives may be written following the same logic.

If BY $$xz = \frac{\partial}{\partial z} \frac{\partial By}{\partial x}$$

the derivative with respect to z of the derivative with respect to x of the component y of the magnetic field. All the other second derivatives may be written following the same logic.

Then, the following model is obtained (all the equations are written in the point of reference of the object 1):

$$\frac{d}{dt}(BXx) = rBYx + rBXy - qBZx - qBXz + BXxxu + BXxyv + BXxzw$$

$$\frac{d}{dt}(BXy) = rBYy - rBXx - qBZy + pBXz + BXyxu + BXyyv + BXyzw$$

$$\frac{d}{dt}(BXz) = +rBYz + qBXx - qBZz - pBXy + BXzxu + BXzyv + BXzzw$$

$$\frac{d}{dt}(BYx) = -rBXx + pBZx + rBYy - qBYz + BYxxu + BYxyv + BYxzw$$

$$\frac{d}{dt}(BYy) = -rBXy + pBYz - rBYx + pBZy + BYyxu + BYyyv + BYyzw$$

$$\frac{d}{dt}(BYz) = -rBXz + pBZz - pBYy + qBYx + BYzxu + BYzyv + BYzzw$$

$$\frac{d}{dt}(BZx) = +qBXx - pBYx + rBZy + qBZz + BZxxu + BZxyv + BZxzw$$

-continued $$\frac{d}{dt}(BZy) = +qBXy - pBYy - rBZx + pBZz + BZyxu + BZyyv + BZyzw$$

$$\frac{d}{dt}(BZz) = +qBXz - pBYz + qBZx - pBZy + BZzxu + BZzyv + BZyzw$$

Where $$\Omega = \begin{pmatrix} p \\ q \\ r \end{pmatrix}$$

is the angular velocity of the object and $$V = \begin{pmatrix} u \\ v \\ w \end{pmatrix}$$

is its linear velocity.

The different coefficients on each of the terms of these equations define the matrices making it possible to express $f_1$ and $g_1$.

For example, $$f_1(\Omega) = \begin{bmatrix} 0 & r & -q & r & 0 & 0 & -q & 0 & 0 \\ -r & 0 & p & 0 & r & 0 & 0 & -q & 0 \\ q & -p & 0 & 0 & 0 & r & 0 & 0 & -q \\ -r & 0 & 0 & 0 & r & -q & p & 0 & 0 \\ 0 & -r & 0 & -r & 0 & -p & 0 & p & 0 \\ 0 & 0 & -r & q & -p & 0 & 0 & 0 & -p \\ q & 0 & 0 & -p & 0 & 0 & 0 & r & -q \\ 0 & q & 0 & 0 & -p & 0 & -r & 0 & p \\ 0 & 0 & q & 0 & 0 & -p & q & -p & 0 \end{bmatrix}$$

It may thus be seen that there are nine components of the equation $\nabla B = f_1(\Omega) \cdot \nabla B + g_1(\nabla_2 B) \cdot V$, which can be used in an independent manner to link the components of $\Omega$ and $V$, i.e. six more than with the equation $\dot{B} = -\Omega \wedge B + \nabla B \cdot V$ alone.

As explained previously, the number of independent components of the gradient ($\nabla B$) may be reduced from 9 to 5 as a function of the hypotheses and the Hessian ($\nabla_2 B$) from 27 to 7 according to the hypotheses, that is to say that the acquisition of 12 components of first derivative or 15 components of the magnetic field suffice.

To return to the example above, in the case where it is considered that the magnetic field is zero divergence and zero rotational, there are only 5 independent components for the gradient to measure (the 5 below are chosen) and 7 for the Hessian (BXxx, BXxy, Bxxz, Bxyy, Bxyz, Byyy, Byyz are chosen), then the following simplified equations are obtained (the terms between square brackets are calculated via the relationships div $\vec{B}=0$ and $\vec{rot}\,\vec{B}=\vec{0}$), the other terms are identical to the system with 9 components.

$$\frac{d}{dt}(BXx) = r[BXy] + rBXy - q[BXz] - qBXz + BXxxu + BXxyv + BXxzw$$

$$\frac{d}{dt}(BXy) = rBYy - rBXx - q[BYz] + pBXz + [BXxy]u + BXyyv + BXyzw$$

$$\frac{d}{dt}(BXz) = +rBYz + qBXx - q[-BXx - BYy] -$$

$$pBXy + [BXxz]u + [BXyz]v + [-BXyy - BXxx]w$$

$$\frac{d}{dt}(BYy) = -rBXy + pBYz - r[BXy] + p[BYz] + [BXyy]u + BYyyv + BYyzw$$

$$\frac{d}{dt}(BYz) = -rBXz + p[-BXx - BYy] - pBYy +$$

$$q[BXy] + [BXyz]u + [BYyz]v + [-BXxy - BYyy]w$$

Equipment and System

According to a second aspect, the invention in particular relates to the equipment 2, 3, 4 for the implementation of one or the other of the embodiments of the method.

As explained previously, according to a first embodiment the equipment is an autonomous case 2 including the magnetometers/gradiometers 20 and the data processing means 21 configured for the implementation of the steps of the method.

The case 2 further includes means for attaching 23 the case 2, and if needs be additional inertial measurement means 24, data storage means 22 (for the storage for example of the estimated movements) and/or communication means 25 for the exportation of the results.

According to a second embodiment, the equipment is a mobile terminal 3 or a server 4, suited for communicating with a case 2 including the inertial measurement means 24. In other words, the terminal 3 or the server 4 includes the processing means 31 or 41 configured for the implementation of the steps of the method. Each case 2 may all the same include data processing means 21 for the control of the means 20, 24 and the transmission (via communication means 25) of the measured data to the data processing means 31, 41.

It should be noted that the means 21, 31, 41 may if needs be share the steps of the method.

The invention also relates to in this case the system including the equipment 3, 4 according to this embodiment and the connected "satellite" case(s) 2.

In all cases, the data processing means 21, 31, 41 of the "main" items of equipment 2, 3, 4 are configured to implement:

A module for receiving at least one (in particular at least 2n+3) component:
 of the magnetic field (if n=0) and/or
 of at least one i-th derivative of the magnetic field, with n+1≥i≥1 and n≥1,
 acquired by the magnetic measurement means 20 integral with said object 1;

A module for estimating at least one component of the movement of said object 1 using at least one component (preferentially $3^{n+1}$) of the equation $\nabla_n B = f_n(\Omega) \cdot \nabla_n B + g_n(\nabla_{n+1} B) \cdot V$, where $\nabla_n B$ is an n-th derivative of the magnetic field, SI the instantaneous angular velocity, V the instantaneous linear velocity, and f and g predetermined functions (as well as optionally one or more equations $\nabla_k B = f_k(\Omega) \cdot \nabla_k B + g_k(\nabla_{k+1} B) \cdot V$, $k \in [\![ 0; n-1 ]\!]$, and conventional inertial equations).

Computer Programme Product

According to a third and a fourth aspect, the invention relates to a computer programme product including code instructions for the execution (on the processing 21, 31, 41) of a method for estimating the movement of an object 1 moving in an ambient magnetic field according to the first aspect of the invention, as well as storage means readable by a computer equipment (for example data storage means 22) on which this computer programme product is found.

The invention claimed is:

1. A method comprising the steps of:
   (a) acquiring, by a magnetic measurement unit integral with an object moving in an ambient magnetic field, at least one component:
      of the magnetic field and/or
      of at least one i-th derivative of the magnetic field, with $i \geq 1$, at the magnetic measurement unit;
   (b) estimating, by a data processing unit, a movement of said object, wherein at least one component of said movement is estimated using at least one component of the equation $\nabla_n B = f_n(\Omega) \cdot \nabla_n B + g_n(\nabla_{n+1} B) \cdot V$, with $n+1 \geq i$ and $n \geq 1$, and $n \geq 1$, where $\nabla_n B$ is an n-th derivative of the magnetic field, $\Omega$ the instantaneous angular velocity, V the instantaneous linear velocity, and $f_n$ and $g_n$ predetermined functions;
   (c) adjusting, by a driving unit of the object, at least one of a speed or a direction of movement of the object in response to the estimated movement.

2. The method according to claim 1, wherein at least (n+2)(n+4) components of the magnetic field and/or at least one i-th derivative of the magnetic field are acquired at step (a), and $3^{n+1}$ components of the equation $\nabla_n B = f_n(\Omega) \cdot \nabla_n B + g_n(\nabla_{n+1} B) \cdot V$ are used at step (b).

3. The method according to claim 1, wherein at least one relationship between components of the equation $\nabla_n B = f_n(\Omega) \cdot \nabla_n B + g_n(\nabla_{n+1} B) \cdot V$ is determined at step (b) by application of the local version of at least one Maxwell equation to the components of the n-th derivative of the magnetic field $\nabla n B$.

4. The method according to claim 1, wherein at least one component of at least one supplementary equation $\nabla_n B = f_k(\Omega) \cdot \nabla_k B + g_n(\nabla_{k+1} B) \cdot V$ with k $\Sigma$, is also used at step (b).

5. The method according to claim 4, wherein k=0, $f_0$=skew, $g_0$=id such that the supplementary equation is $B = -\Omega \times B + \nabla B \cdot V$.

6. The method according to claim 1, wherein step (a) further includes acquiring, by an inertial measurement sensor integral with said object, at least one component of the angular velocity $\Omega$.

7. A method comprising the steps of:
   (a) acquiring, by a magnetic measurement unit integral with an object moving in an ambient magnetic field, at least one component:
      of the magnetic field and/or
      of at least one i-th derivative of the magnetic field, with $i \geq 1$, at the magnetic measurement unit;
   (b) estimating, by a data processing unit, a movement of said object, wherein at least one component of said movement is estimated using at least one component of the equation $\nabla_n B = f_n(\Omega) \cdot \nabla_n B + g_n(\nabla_{n+1} B) \cdot V$, with $n+1 \geq i$ and $n \geq 1$ where $\nabla_n B$ is an n-th derivative of the magnetic field, $\Omega$ the instantaneous angular velocity, V the instantaneous linear velocity, and $f_n$ and $g_n$ predetermined functions;
   (c) capturing an image of a scene with a camera of the object,
   (d) displaying the image together with overlapping visual information, and
   (e) adjusting a position of the overlapping visual information in the displayed image in response to the estimated movement.

8. The method according to claim 7, wherein at least (n+2)(n+4) components of the magnetic field and/or at least one i-th derivative of the magnetic field are acquired at step (a), and $3^{n+1}$ components of the equation $\nabla_n B = f_n(\Omega) \cdot \nabla_n B + g_n(\nabla_{n+1} B) \cdot V$ are used at step (b).

9. The method according to claim 7, wherein at least one relationship between components of the equation $\nabla_n B = f_n(\Omega) \cdot \nabla_n B + g_n(\nabla_{n+1} B) \cdot V$ is determined at step (b) by application of the local version of at least one Maxwell equation to the components of the n-th derivative of the magnetic field $\nabla_n B$.

10. The method according to claim 7, wherein at least one component of at least one supplementary equation $\nabla_k B = f_k(\Omega) \cdot \nabla_k B + g_n(\nabla_{k+1} B) \cdot V$ with k$\in$, is also used at step (b).

11. The method according to claim 7, wherein step (a) further includes acquiring, by an inertial measurement sensor integral with said object, at least one component of the angular velocity $\Omega$.

12. A method comprising the steps of:
   (a) acquiring, by a magnetic measurement unit integral with an object moving in an ambient magnetic field, at least one component:
      of the magnetic field and/or
      of at least one i-th derivative of the magnetic field, with $i \geq 1$, at the magnetic measurement unit;
   (b) estimating, by a data processing unit, a movement of said object, wherein at least one component of said movement is estimated using at least one component of the equation $\nabla_n B = f_n(\Omega) \cdot \nabla_n B + g_n(\nabla_{n+1} B) \cdot V$, with $n+1 \geq i$ and $n \geq 1$, where $\nabla_n B$ is an n-th derivative of the magnetic field, $\Omega$ the instantaneous angular velocity, V the instantaneous linear velocity, and $f_n$ and $g_n$ predetermined functions;
   (c) displaying a virtual scene on a display of the object, and
   (d) adjusting a position of an array of rendered pixels relative to the virtual scene in response to the estimated movement.

13. The method according to claim 12, wherein at least (n+2)(n+4) components of the magnetic field and/or at least one i-th derivative of the magnetic field are acquired at step (a), and $3^{n+1}$ components of the equation $\nabla_n B = f_n(\Omega) \cdot \nabla_n B + g_n(\nabla_{n+1} B) \cdot V$ are used at step (b).

14. The method according to claim 12, wherein at least one relationship between components of the equation $\nabla_n B = f_n(\Omega) \cdot \nabla_n B + g_n(\nabla_{n+1} B) \cdot V$ is determined at step (b) by application of the local version of at least one Maxwell equation to the components of the n-th derivative of the magnetic field $\nabla_n B$.

15. The method according to claim 12, wherein at least one component of at least one supplementary equation $\nabla_k B = f_k(\Omega) \cdot \nabla_k B + g_n(\nabla_{k+1} B) \cdot V$, with k$\in$, is also used at step (b).

16. The method according to claim 12, wherein step (a) further includes acquiring, by an inertial measurement sensor integral with said object, at least one component of the angular velocity $\Omega$.

17. A method comprising the steps of:
   (a) acquiring, by a magnetic measurement unit integral with an object moving in an ambient magnetic field, at least one component:
      of the magnetic field and/or
      of at least one i-th derivative of the magnetic field, with $i \geq 1$, at the magnetic measurement unit;

(b) estimating, by a data processing unit, a movement of said object, wherein at least one component of said movement is estimated using at least one component of the equation $\nabla_n B = f_n(\Omega) \cdot \nabla_n B + g_n(\nabla_{n+1} B) \cdot V$, with $n+1 \geq i$ and $n \geq 1$, where $\nabla_n B$ is an n-th derivative of the magnetic field, $\Omega$ the instantaneous angular velocity, V the instantaneous linear velocity, and $f_n$ and $g_n$ predetermined functions;

(c) displaying visual information on a transparent display surface of the object, and (d) adjusting a position of the visual information on the transparent display surface in response to the estimated movement.

18. The method according to claim 17, wherein at least $(n+2)(n+4)$ components of the magnetic field and/or at least one i-th derivative of the magnetic field are acquired at step (a), and $3^{n+1}$ components of the equation $\nabla_n B = f_n(\Omega) \cdot \nabla_n B + g_n(\nabla_{n+1} B) \cdot V$ are used at step (b).

19. The method according to claim 17, wherein at least one relationship between components of the equation $\nabla_n B = f_n(\Omega) \cdot \nabla_n B + g_n(\nabla_{n+1} B) \cdot V$ is determined at step (b) by application of the local version of at least one Maxwell equation to the components of the n-th derivative of the magnetic field $\nabla_n B$.

20. The method according to claim 17, wherein at least one component of at least one supplementary equation $\nabla_k B = f_k(\Omega) \cdot \nabla_k B + g_n(\nabla_{k+1} B) \cdot V$, with $k \in$, is also used at step (b).

\* \* \* \* \*